Jan. 14, 1958  E. D. MARKLE  2,819,533
OPTICAL AXIS ALIGNMENT DEVICE
Filed June 22, 1953
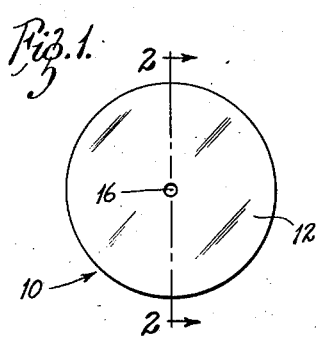
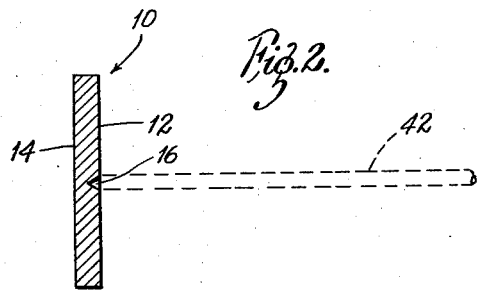
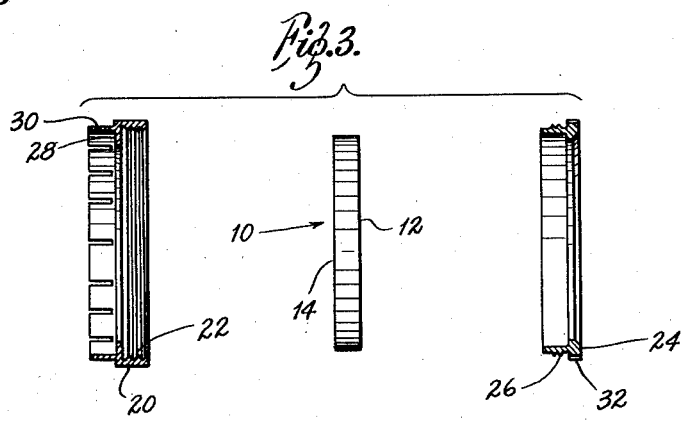
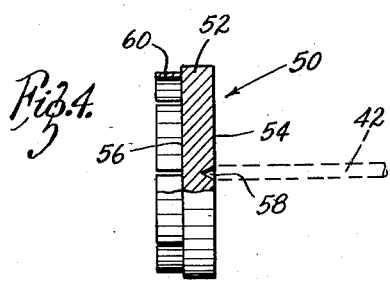
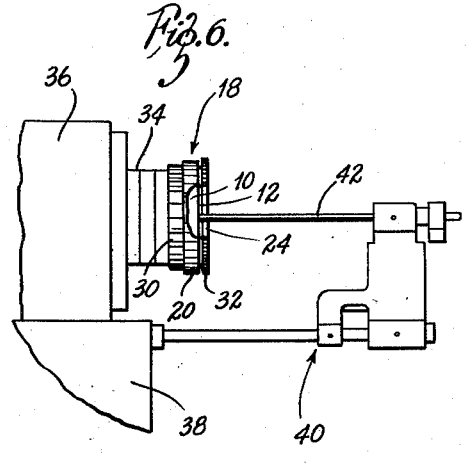
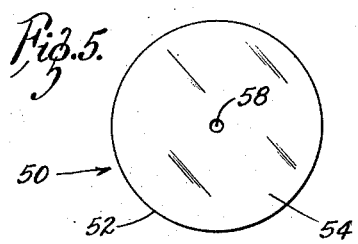
INVENTOR:
EDWARD D. MARKLE
BY Kingsland, Rogers + Ezell
ATTORNEYS united States Patent Office 2,819,533
Patented Jan. 14, 1958

2,819,533

OPTICAL AXIS ALIGNMENT DEVICE

Edward D. Markle, Jefferson City, Mo.

Application June 22, 1953, Serial No. 363,297

7 Claims. (Cl. 33—180)

The present invention relates generally to photography, and more particularly to camera focusing devices for use in high magnification photography.

Specifically, the present invention is an optical axis centering or aligning device forming a part of my camera focusing device disclosed and claimed in United States Patent No. 2,609,737, granted September 9, 1952. A photographic stand for supporting my camera focusing device is disclosed and claimed in my United States Patent No. 2,599,269, granted June 3, 1952. For simplicity, the disclosures of these two patents are incorporated herein by reference.

In brief, the present novel optical axis alignment device in its preferred embodiment comprises a solid disc having an indentation in one face at the center thereof. The disc is of a size to snugly fit within a conventional lens mount adapter ring. A modified optical axis alignment device comprises a disc as described, which includes an annular flange extending outwardly from the face of the disc opposite to that having the indentation which is segmentized to facilitate mounting of the device upon the lens mount of a camera.

The second-mentioned form of the present invention is disclosed in my Patent No. 2,609,737 in Figs. 6 and 7. In view of the discussion of magnification photography included in this and my other mentioned patent, it is sufficient to state here that the present device contributes materially to accurate alignment of the optical axis of the camera, which is essential in high magnification photography in which a small relatively inexpensive camera, as 35 mm., is used, for the entire picture can easily be missed by the camera when it is out of alignment. With a small camera, the eyes of the operator without mechanical assistance cannot insure a properly centered picture, or, in fact, any picture at all, in high magnification photography.

Therefore, an object of the present invention is to provide a novel device for aligning the optical axis of the camera in high magnification photography, which finds particular adaptation with small cameras using film of small dimensions.

Another object is to provide a novel optical axis alignment device for use in high magnification photography which may be readily applied to the lens of a camera without modification thereof, and which is extremely simple both in its component parts and in its full use and application.

Another object is to provide a novel optical axis alignment device for use in high magnification photography which in one form may be employed with substantially any conventional or standard lens mount adapter ring.

Another object is to provide a novel optical axis alignment device for us in high magnification photography which facilitates the employment of an auxiliary lens with a small ordinary camera for taking accurately centered high magnification pictures.

Another object is to provide a novel optical axis alignment device comprising a disc or other shaped member having a physical visible center which may be employed with any camera in high magnification photography in which an auxiliary lens is used.

Other objects are to provide a novel optical axis alignment device which is inexpensive, which may be employed by an amateur with results normally achieved by the expert in magnification photography, and which otherwise fulfills the objects and advantages sought therefor.

The foregoing and other objects and advantages are apparent from the following description taken with the accompanying drawing, in which:

Fig. 1 is a front view of an optical axis alignment disc incorporating the teachings of the present invention;

Fig. 2 is a cross-sectional view on substantially the line 2—2 of Fig. 1, an axis alignment pointer portion being shown in dotted lines;

Fig. 3 is an exploded view showing the two elements of a conventional lens mount adapter ring in diametric cross section and the disc of Fig. 1 in end elevation therebetween;

Fig. 4 is an end elevational view, partly in cross section, of a modified optical axis alignment device, a portion of an axis alignment pointer being shown in dotted lines Fig. 5 is a front view of the modified device of Fig. 4; and Fig. 6 is a diagrammatic view in side elevation illustrating the assembly of Fig. 3 mounted upon the lens mount unit of a camera which is mounted on a camera focusing device.

Referring to the drawing more particularly by reference numerals, and specifically considering Figs. 1 through 3 and 6, 10 indicates generally an optical axis alignment disc constructed in accordance with the teachings of the present invention. The disc 10 includes two planar parallel faces 12 and 14, in the center of the former of which is an indentation 16, illustrated as conical in form. The disc 10 is shown as formed of metal, but any suitable material may be used.

The disc 10 is of a thickness and diameter to fit snugly within a conventional lens mount adapter ring 18, one make of which comprises a first ring segment 20 having internal threads 22 and a second ring segment 24 having external threads 26 which engage the threads 22 for telescopic engagement of the second ring segment 24 with the first ring segment 20. The first ring segment 20 also includes an annular radial flange 28 and a split ring flange 30 secured to and at right angles to the flange 28 which is adapted to engage the lens mount unit of a camera for mounting of the normally enclosed auxiliary lens. The ring segment 24 has a knurled inwardly and outwardly extending radial flange 32.

It is obvious from an inspection of Fig. 3 that the disc 10 is of a diameter to just fit within the ring segment 24 and of a thickness to be trapped between the flange 28 of the ring segment 20 and the inwardly extending portion of the flange 32 of the ring segment 24. The adapter ring 18 with the disc 10 enclosed is then mounted upon the lens mount unit 34 of a camera as illustrated in Fig. 6.

With particular reference to Fig. 6, the adapter ring 18 is mounted upon the lens mount unit 34 of a camera 36 secured to a support 38 forming part of a camera focusing device 40 diagrammatically shown here, but which may be like that disclosed in my Patent No. 2,609,737. An axis alignment pointer 42 is illustrated as centered in the indentation 16 of the disc 10 disposed within the adapter ring 18 and perpendicular thereto. This relationship of the disc 10 and the axis alignment pointer 42 is more clearly shown in Fig. 2.

In Figs. 4 and 5 is illustrated another embodiment of the present Invention which comprises a self-mounting optical axis alignment disc 50. The disc 50 includes a disc body 52 like the disc 10 having a front face 54 and a rear face 56. In the center of the front face 54 is an indentation 58. Extending from the face 56 is a split annular flange 60. The split flange 60 is like the flange 30 of the adapter ring 18, and it is to be understood that the disc 50 is mounted directly upon the lens mount unit 34 of the camera 36 in the same manner as the conventional adapter ring 18.

In using the present device, the disc 10 is placed in the adapter ring 18 and the assembly is attached to the lens mount unit 34 of a camera 36 as is shown in Fig. 6. Thus, the disc 10 assumes the position which is normally occupied by an auxiliary lens which is disposed within the adapter ring 18 when the camera 36 is employed for high magnification photography. With the disc 10 within the adapter ring 18 as stated, the axis alignment pointer 42 of the camera focusing device 40 is brought into physical contact with the indentation 16 thereof perpendicular to the face 12 of the disc 10. Thereupon, the lens of the camera 36 and the axis alignment pointer 42 are in alignment and the pointer 42 may be moved axially in its mount away from the adapter ring 18 to permit removal therefrom of the disc 10 and the insertion therein of the usual auxiliary lens. The camera 36 and the focusing device 40 are then ready for high magnification photography, such as is detailed in my two abovementioned patents.

The disc 50 is employed as a self mounting optical axis alignment unit. It is disposed upon the lens mount unit 34 of the camera 36 in the same manner as the ring 18. Thereupon, the alignment pointer 42 is disposed with the point thereof in the indentation 58. The pointer 42 is moved axially to permit removal of the disc 50 and the substitution upon the lens mount unit 34 of an adapter ring, such as 18, enclosing an auxiliary lens.

It is manifest from the foregoing that the present device mechanically aligns the optical axis of the camera with the pointer of a camera focusing device. Without the present device, alignment of a pointer to be used in conjunction with the camera, or alignment of the camera per se, becomes guesswork resulting in "hit or miss" photography in the high magnification field, particularly with a small camera.

It is apparent that there has been provided an optical axis alignment device which fulfills the objects and advantages sought therefor.

It is to be understood that the foregoing description and the accompanying drawing have been given only by way of illustration and example, and that changes and alterations in the present disclosure, which will be readily apparent to one skilled in the art, are contemplated as within the scope of the present invention, which is limited only by the claims which follow.

What is claimed is:

1. An optical axis alignment device for attachment to a camera for axially aligning the lens thereof with a subject pointer comprising, in combination, a disc member having a face portion, an indentation in said face portion centrally thereof, and means separate from said member for removably mounting said disc member in front of the regular lens of a camera.

2. An optical axis alignment device for attachment to a camera for axially aligning the lens thereof with a subject pointer comprising, in combination, a disc member having parallel faces, an indentation in one face centrally thereof, and means separate from said member for removably mounting said disc member in front of the regular lens of a camera.

3. An optical axis alignment device for attachment to a camera for axially aligning the lens thereof with a subject pointer comprising, in combination, a disc member having a face portion, an indentation in said face portion centrally thereof, and means separate from said member for removably mounting said disc member in front of the regular lens of a camera, said member being disposed in the zone of a removed auxiliary lens when in operative position on a camera.

4. An optical axis alignment device for attachment to a camera for axially aligning the lens thereof with a subject pointer comprising, in combination, a disc member having parallel faces, an indentation in one face centrally thereof, and means separate from said member for removably mounting said disc member in front of the regular lens of a camera, said disc member being disposed in the zone of a removed auxiliary lens when in operative position on a camera.

5. An optical axis alignment device for attachment to a camera for axially aligning the lens thereof with a subject pointer comprising, in combination, a disc member having parallel faces, an indentation in one face centrally thereof, and an open casing removably receiving said disc and including means for removably mounting said device in front of the regular lens of a camera.

6. An optical axis alignment device for attachment to a camera for mechanically axially aligning the lens thereof with a subject pointer comprising, in combination, a member for disposition forwardly of the regular lens of a camera, an indentation in said member which is on the optical axis of the camera when said member is operatively mounted on a camera, and means separate from said member for removably mounting said member forwardly of the regular lens of a camera.

7. An optical axis alignment device for attachment to a camera for mechanically axially aligning the lens thereof with a subject pointer comprising, in combination, a member for disposition forwardly of the regular lens of a camera, an indentation in said member which is on the optical axis of the camera when said member is operatively mounted on a camera, and an open casing removably receiving said member and including means for removably mounting said device in front of the regular lens of a camera.

References Cited in the file of this patent

UNITED STATES PATENTS

| | | |
|---|---|---|
| 1,239,145 | Wantz | Sept. 4, 1917 |
| 1,971,434 | Trautmann | Aug. 28, 1934 |
| 2,372,223 | Nagel | Mar. 27, 1945 |
| 2,539,324 | Pollock | Jan. 23, 1951 |
| 2,551,703 | Puls | May 8, 1951 |
| 2,609,737 | Markle | Sept. 9, 1952 |
| 2,639,513 | Ricord | May 26, 1953 |